(12) United States Patent
Gagner et al.

(10) Patent No.: US 6,996,600 B2
(45) Date of Patent: Feb. 7, 2006

(54) SYSTEM AND METHOD FOR SERVICING MESSAGES BETWEEN DEVICE CONTROLLER NODES AND VIA A LON NETWORK

(75) Inventors: Mark Gagner, Chicago, IL (US);
Michael Soemo, Lombard, IL (US);
Robert Johnson, Vernon Hills, IL (US);
Peggy Ruane, Wheeling, IL (US)

(73) Assignee: Siemens Building Technologies Inc., Buffalo Grove, IL (US)

( * ) Notice: Subject to any disclaimer, the term of this patent is extended or adjusted under 35 U.S.C. 154(b) by 773 days.

(21) Appl. No.: 09/967,468

(22) Filed: Sep. 28, 2001

(65) Prior Publication Data
US 2003/0065707 A1 Apr. 3, 2003

(51) Int. Cl.
*G06F 15/16* (2006.01)

(52) U.S. Cl. .................... 709/201; 709/224; 370/522; 703/21

(58) Field of Classification Search ........ 709/223–224, 709/230; 703/21; 370/522; 719/318
See application file for complete search history.

(56) References Cited

U.S. PATENT DOCUMENTS

| | | | |
|---|---|---|---|
| 6,185,566 B1 | 2/2001 | Adams et al. ................ 707/10 |
| 6,185,613 B1 * | 2/2001 | Lawson et al. .............. 709/224 |
| 6,223,182 B1 | 4/2001 | Agarwal et al. ............. 707/102 |
| 6,249,844 B1 | 6/2001 | Schloss et al. .............. 711/122 |
| 6,457,021 B1 | 9/2002 | Berkowitz et al. .......... 707/201 |
| 6,487,457 B1 | 11/2002 | Hull et al. .................... 700/17 |
| 6,523,036 B1 | 2/2003 | Hickman et al. ............. 707/10 |
| 6,725,281 B1 * | 4/2004 | Zintel et al. ................ 719/318 |
| 6,763,040 B1 * | 7/2004 | Hite et al. ................... 370/522 |
| 2002/0152298 A1 | 10/2002 | Kikta et al. ................. 709/223 |
| 2002/0188433 A1 * | 12/2002 | Prasad et al. ................. 703/21 |

* cited by examiner

*Primary Examiner*—Wen-Tai Lin

(57) ABSTRACT

The present invention includes a system (FIG. 4) for servicing messages between device controller nodes and control applications via a Lon Network, wherein the device controller nodes includes a plurality of network variables for defining parameters of the Lon Network. The system includes a server for servicing the messages from at least one control application, a proprietary communication value for indicating a network variable value from the control applications, and a Lon value for indicating a network variable value exposed on the Lon Network. There is also a method that includes the steps of reading a message from the control application, verifying whether the message is valid, determining the requested function for a specified network variable from the message when the message is valid, executing the requested function for the specified network variable, and sending subscribed reports in response to a change of value of the network variables independently of the foregoing steps (170).

35 Claims, 15 Drawing Sheets

SYSTEM AND METHOD FOR SERVICING MESSAGES BETWEEN DEVICE CONTROLLER NODES AND VIA A LON NETWORK

BACKGROUND OF THE INVENTION

The present invention generally relates to an improved system and method for servicing messages between device controller nodes and control applications (i.e. control applications) via a Lon Network. More particularly, an improved system and method for servicing messages between device controller nodes and control applications via a Lon Network, wherein the device controller nodes include a plurality of network variables for defining parameters of the Lon Network.

Supervisory and control systems for buildings have become ever more complex and sophisticated to the extent that computer networks are employed that provide control to many systems within a building or multiple buildings, such as Heating, Ventilation, & Air Conditioning systems ("HVAC"), security and fire systems, as well as energy utilization and other systems. There is a trend toward the use of open architecture in this field so that building owners can more easily and economically add to or modify such systems without being limited to that which is offered by a single manufacturer.

One network solution that has enjoyed increasing use is LonWorks® ("Lon Network") created by EMC Engineers, Inc. The Lon Network uses Network Variables ("NV") to expose and exchange process values between distributed nodes on the network, Network variables may be designated as inputs, which receive values from the network, or outputs, which transmit values onto the network. When a Lon Network system is commissioned the network variables that are associated with one another are tied together through a procedure referred to as binding. Network variables that have been associated in this manner are referred to as Bound network variables. When the value of an output network variable changes then the new value is automatically propagated to all of the input network variables that have been previously bound to that output. Within a Lon Network system the use of bound Network Variables is the primary mechanism by which control applications communicate with one another. The types and number of NVs in each node, which is defined as a LonWorks® technology based device, are determined by the device control application code within the node. The use of the Lon Network with a HVAC control system has proven to be relatively inflexible, inefficient and difficult to update.

One problem is that the Lon Network does not provide a simple way to set a limit for the reporting of a change of value for each specific network variable. Consequently, updates are often sent without discretion on a continuous basis, even when the change of value is insignificant. In other words, the Lon Network sends out an update of the NV value no matter how small the change of value was, and this causes bandwidth to be wasted.

Still another problem is that the Lon Network does not provide a means to discriminate between the sources of an update. There is no means for a supervisory agent to exercise exclusive control over the value of a network variable that is bound to another source. To override the value of a network variable ("NV") on the Lon Network from a system control application, the NV must not be bound to another NV on the Lon Network. The process to remove the binding, provide the override value for a period of time, then create the binding again takes a significant amount of time. Furthermore, that is especially undesirable when the system controls a variety of parameters, such as temperature or humidity, because it is likely that multiple NVs may have to be worked on at the same time. In addition, the binding information is generally stored in Flash memory which has a limited number of erase/write cycles so removing and replacing bindings effectively reduces the operational life of the device controller.

Thus, there is a need in the art for a device that overcomes one or more of the foregoing problems.

BRIEF SUMMARY OF THE INVENTION

The present invention generally relates to an improved system and method for servicing messages between device controller nodes and system control applications via a Lon Network. More particularly, an improved system and method for servicing messages between device controller nodes and system control applications via a Lon Network, wherein the device controller nodes include a plurality of network variables for defining parameters of the Lon Network.

The present invention includes a system that includes an NV Server for servicing messages from one or more device control or system control applications. Each NV on the NV Server has a proprietary communication value for indicating the network variable value to and from the controller applications, and a Lon value for indicating a network variable value as exposed on the Lon Network.

The present invention further includes a method including the steps of reading a message from a controller application, verifying whether the message is valid, determining the requested function from the message when the message is valid, executing the requested function, and sending update reports in response to a change of value of the network variables.

GLOSSARY OF TERMS AND ACRONYMS

Figure 1:
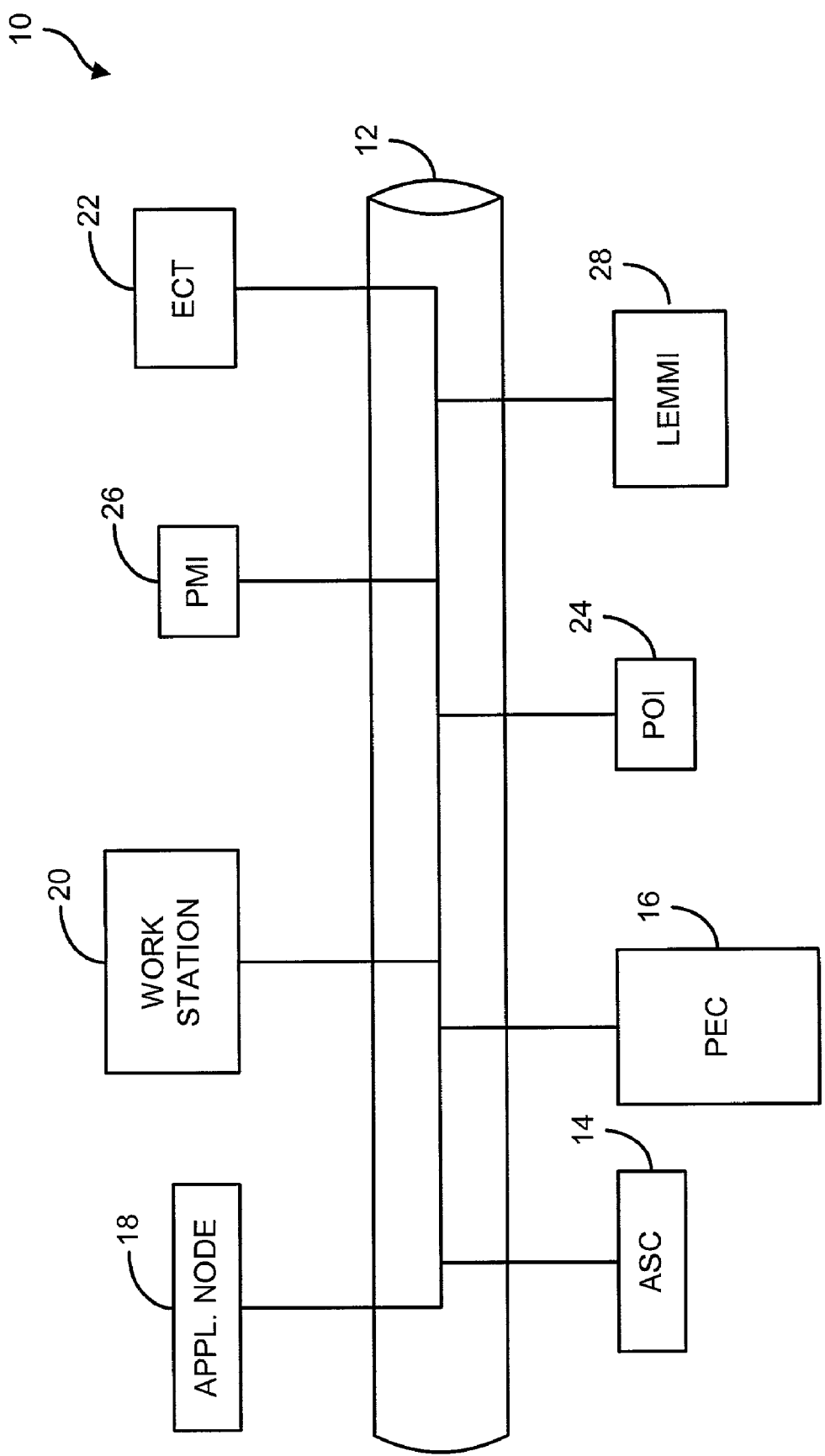
FIG. 1 is a block diagram of a control system having a set of network devices, including an application node, coupled with a communication network in which the present invention can be implemented.

The following terms and acronyms are used throughout the detailed description:

Application node. A node that provides services to the other network devices such as scheduling, data logging, paging, printing, alarm management and routing and protocol conversion.

Application Program Interface. A collection of functions that an application uses to access a service.

Application Specific Controller ("ASC"). A device controller configured to control a local mechanical and/or electronic device associated with a specific application such as, for example, a Variable Air Volume application or Heat Pump application.

Change of Value "COV". A COV indicates that there is a change in a particular network variable.

Control Application. A software program that interacts with an NV Server.

Device Controller Node. A Node that includes an NV Server and a device control application appropriate to the specific purpose of the controller.

Device Control Application. A control application that executes logic or algorithms related to the control of a specific mechanical device such as a chiller or boiler.

Engineering and Commissioning Tool ("ECT"). A tool that performs system engineering and commissioning which may also be used to graphically program the programmable equipment controller.

Low End Human Machine Interface. An interface by which an operator may monitor/control the system.

LDP. Lon Datagram Protocol. A proprietary protocol embedded within a Lon Network explicit message.

Node. A LonWorks® technology based device.

Network Variable ("NV"). A Network Variable is a LonWorks term for a high-level variable that nodes use to communicate with one another. The types and number of NV in each node are determined by the device control application code within the node. A node's NVs define its inputs and outputs from a network point of view and allow the sharing of data values in a distributed fashion.

Operator workstation. A workstation that can automatically upload and download network image data and system data and includes a user interface by which users may access control system information that may be adapted to provide graphics, exception reporting, diagnostics, report generation, display, printing and dialout.

Panel Mount Interface. An interface by which an operator may monitor/control the system Portable operator interface ("POI"). An interface by which an operator may monitor/control the system.

Programmable Equipment Controller ("PEC"). A device controller that is configurable to control a local mechanical and/or electronic device associated with any desired type of application.

Proprietary Communication. Communication that is carried out using a protocol that works on top of or is embedded within the LonWorks network protocol System Control application. A control application that executes logic or algorithms used to obtain information from or coordinate the operation of one or more device controllers. A system control application may include a man-machine interface used to convey commands from a human operator to device controllers.

DETAILED DESCRIPTION

Referring now to the drawings wherein like reference numerals refer to similar or identical parts throughout the several views, and more specifically to FIG. 1 thereof, a control network 10 for providing, for example, building control includes a communication network 12 to support communication between a set of network control devices including an application specific controller ("ASC") 14, a programmable equipment controller ("PEC") 16, an application node 18, an operator workstation 20, and an engineering and commissioning tool ("ECT") 22. The network control devices may further include a set of interfaces by which an operator may monitor/control the system including a portable operator interface ("POI") 24, a panel mount interface 26, and a low end human machine interface 28 having a small display and limited features.

The application specific controller 14 is configured to control a local mechanical and/or electronic device (not shown) associated with a specific application such as a Variable Air Volume. In contrast, the programmable equipment controller 16 is configurable to control a local mechanical and/or electronic device (not shown) associated with any desired type of application. The application node 18 provides services to the other network devices such as scheduling, data logging, paging, printing, alarm management and routing and protocol conversion. The operator workstation 20 automatically uploads and downloads network image data and system data and includes a user interface by which users may access control system information. The workstation 20 may be adapted to provide graphics, exception reporting, diagnostics, report generation, display, printing and dialout.

System engineering and commissioning is performed via the engineering and commissioning tool 22 which may also be used to graphically program the programmable equipment controller 16. In addition, the engineering and commissioning tool 22 may be used to compile data, download configuration data, perform diagnostics, generate and display reports and upload/download system data.

Figure 2:
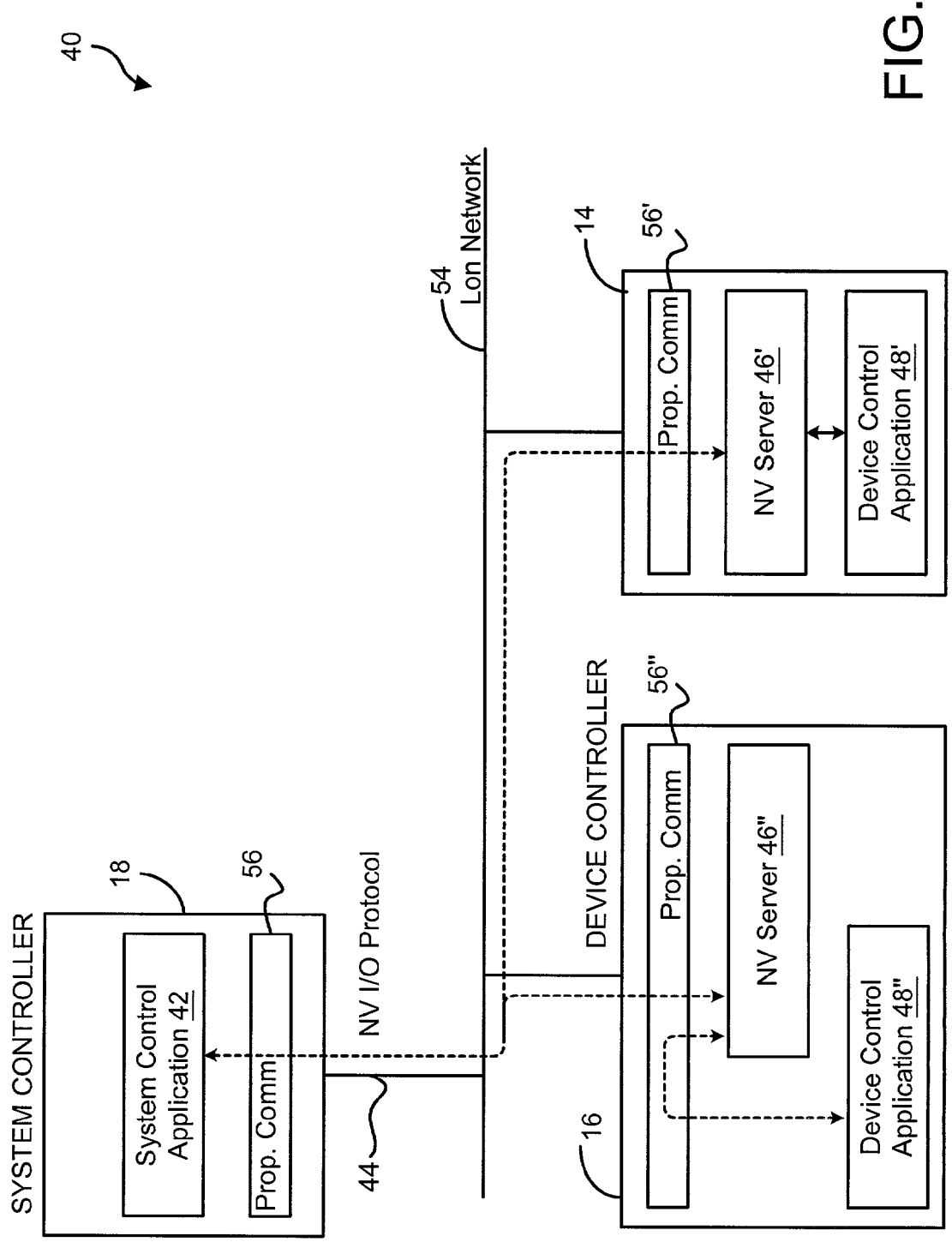
FIG. 2 illustrates a preferred network topology of the Proprietary Communication system.

A preferred network topology of the Proprietary Communication ("PC") system is next shown in FIG. 2, and generally indicated at 40. The system includes a plurality of system controller nodes 18 (one shown) installed with one or more system control applications 42 (one shown) connected, using an NV IO Protocol 44, to a plurality of device controller nodes 14 and 16 (two shown). Though this is the preferred arrangement, it should be obvious to one skilled in the art that system control applications and device control applications may reside on any node within in the system and may reside on the same node when it is advantageous to do so.

Each of the device controllers contains a Network Variable Server ("NV Server") 46', 46", a Device Control Application and a Proprietary Communication Layer. In the preferred implementation shown in device controller 16, a Device Control Application 48" communicates with the NV Server 46" through the PC Layer 56" using the NV I/O protocol 44. However, it will be clear to one skilled in the art that components may interact directly if they are located on the same node as depicted in Device Controller 14, which shows Device Control Application 48' in direct communication with the NV Server 46'.

Figure 3:
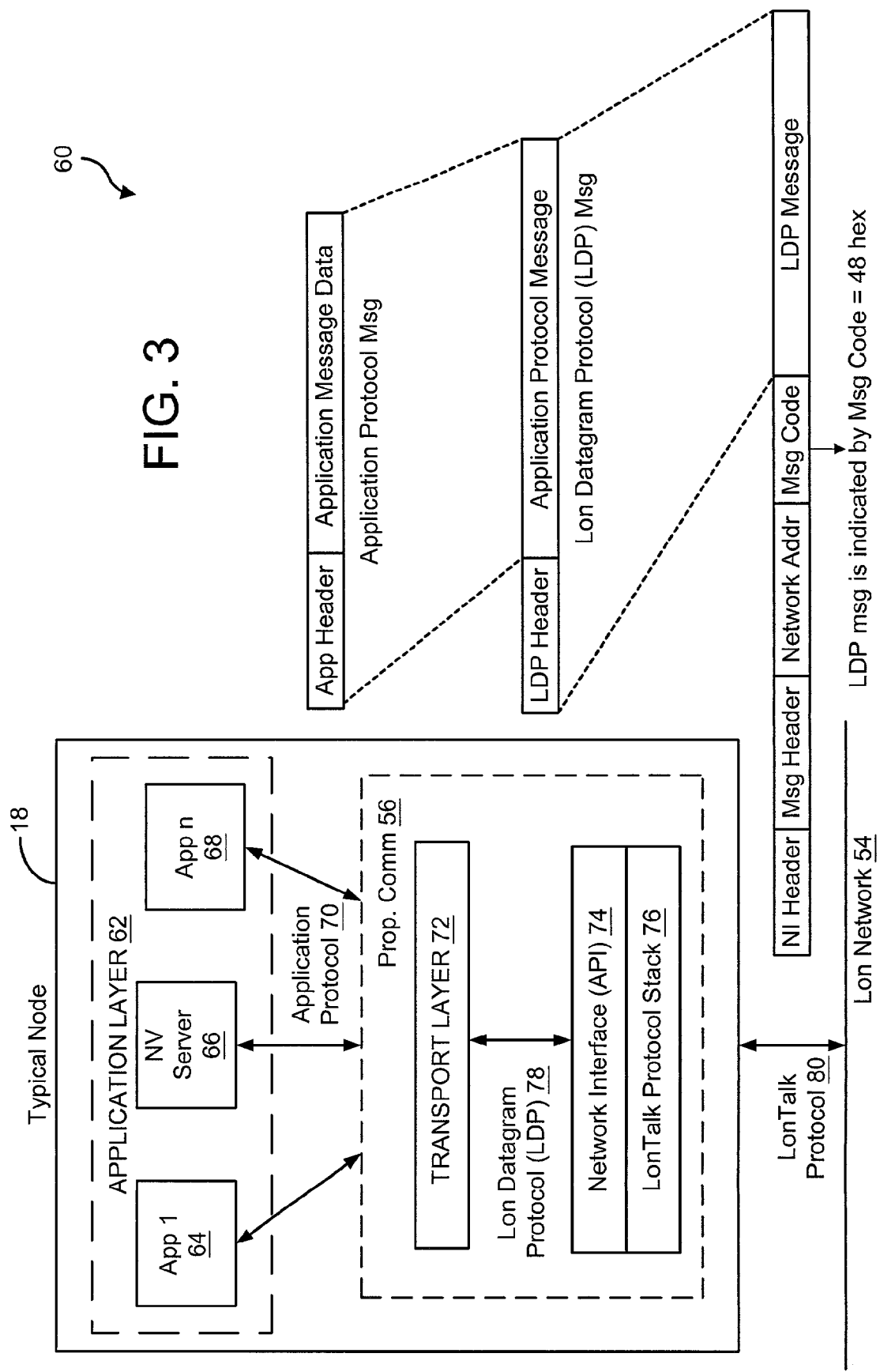
FIG. 3 illustrates an overall preferred diagram of the communication layers with the receipt of NV IO message on the Lon Network.

An example of the System Controller node 18 is described in commonly assigned patent application entitled, "A System Controller For Controlling A Control Network Having An Open Communication Protocol Via Proprietary Communication" filed simultaneously herewith. An example of the NV IO Protocol 44, on the other hand, is described in commonly assigned patent application entitled, "A Proprietary Protocol For Communicating Network Variables on a Control Network" filed simultaneously herewith. As shown, the PC system allows the multiple applications to exchange messages on the Lon Network. For example, the system control application, the device control application and the NV servers are all components that utilize the PC System. With all of these different components using the PC System, messages can be freely exchanged through the HVAC control system. An overall preferred diagram of the communication layers on the Lon Network is shown in FIG. 3, and generally indicated at 60. A typical node 18 is shown with an application layer 62 and a Proprietary Communication subsystem 56.

The application layer 62 may include multiple applications 64, 66, 68. Note that the maximum number of applications allowed on a typical node depends upon the hardware limitations of the node itself. An application "1" 64, a NV server application 66 and an application "n" 68 are shown as examples.

In the preferred implementation, the PC layer includes a transport layer 72, a network interface 74 and a LonTalk protocol stack 76. Because it is contemplated that a typical node can include many types of applications, such as a NV server application 66 or a system control application 42 (shown in FIG. 2), there are various ways to implement the PC layer 56 of the present invention. As a result, various networks are also contemplated, such as the Internet. Thus, it should be understood that these various network topologies implemented on a wide array of available networks are within the scope of the present invention.

The applications 64, 66, 68, using messages determined by the application protocol 70, transmit application protocol messages to a transport layer 72, which accordingly sends the message to the designated local application or to the designated protocol stack, such as the LonTalk Protocol stack 76, through an appropriate Network Interface 74. using the Lon Datagram Protocol ("LDP") 78.

The transport layer 72 embeds the application protocol message in an LDP message by adding an LDP header to the message, The LDP header contains fields for identifying the source application and the desired destination application. If the desired destination resides on the same node then the transport layer directs the message to the proper application. On the other hand, when the desired destination application resides on a remote node then the transport layer 72 embeds the LDP message in a LonTalk message and directs it to the LonTalk protocol stack 76 via the network interface 74. It should also be noted that the LDP message is indicated by the Message Code, which is 48 hex in the preferred implementation.

Figure 4:
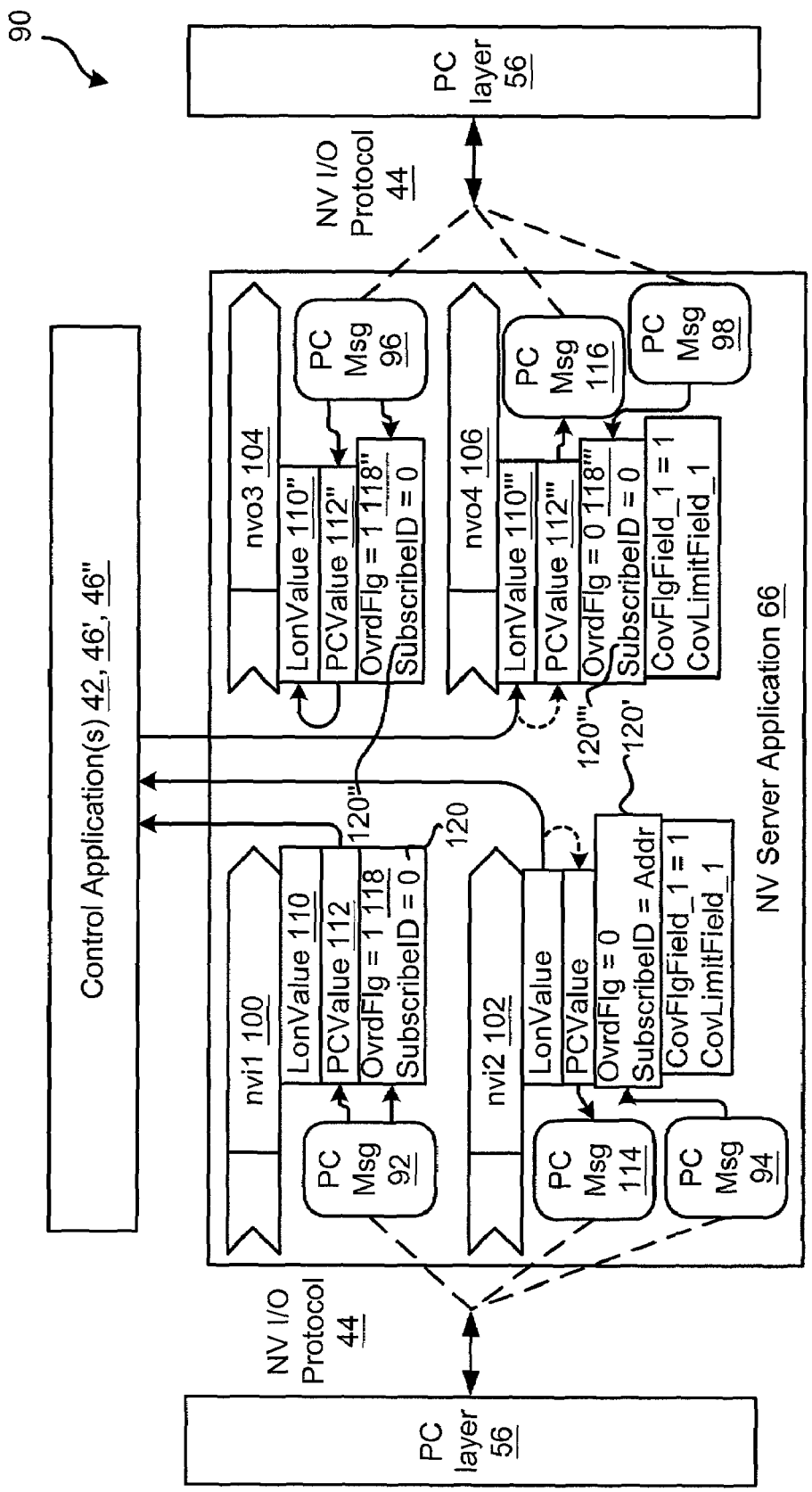
FIG. 4 illustrates a diagram of the execution of the NV Server Application.

A diagram showing a general description of the interactions that take place within the NV Server Application is shown in FIG. 4, and indicated generally at 90. Multiple NV I/O Protocol messages 92, 94, 96, 98, 114, 116 relating to the Network Variables ("NV") 100, 102, 104, 106 are sent between the NV Server Application 66 and a device control application or system control application via the PC layer 56 using the NV I/O Protocol 44. In addition, each NV 100, 102, 104, 106 further includes, among other things, an Override Flag 118 (e.g., OvrdFlg) to indicate whether the NV is in an override state and a Subscribe Identification 120 (e.g., SubscribeID) to indicate whether the NV is in a subscribe state. If the Subscribe Identification is not in a subscribe state, a "0" is assigned. However, if the Subscribe Identification is in a subscribe state, an address of for the subscribed reports will be assigned. Although a single Subscribe Identification is shown for simplicity, there are likely multiple Subscribe Identification for each NV. Again, the Subscribe Identification allows for a more customized and user defined system.

When a Network Variable input is in an override state, the PC Value 112 will be reported to the control application instead of the Lon Value being reported to the control application. When a Network Variable output is in an override state, the PC Value 112" will be copied to the Lon Value 110" instead of a value from the control application being copied to the Lon Value. Thus, there are a plurality of values (two shown) for each network variable and an order of precedence for determining which value is reported. Although only two values are shown for simplicity, it should be clear that this concept may be extended to include multiple values with a range of precedence.

The subscribe state indicates that this specific NV will send a NV I/O Message 114, 116 whenever there is a change of value that exceeds the limit set by the user. As a result, more customization and user defined parameters are achieved through the use of the present invention.

Some NVs may further include one or more fields, and each field is uniquely identified in the NV (e.g. Field_1). Consequently, each field of the NV can be subscribed for (e.g. CovFlgField) with a limit for each field (e.g. CovLimitField).

Figure 5:
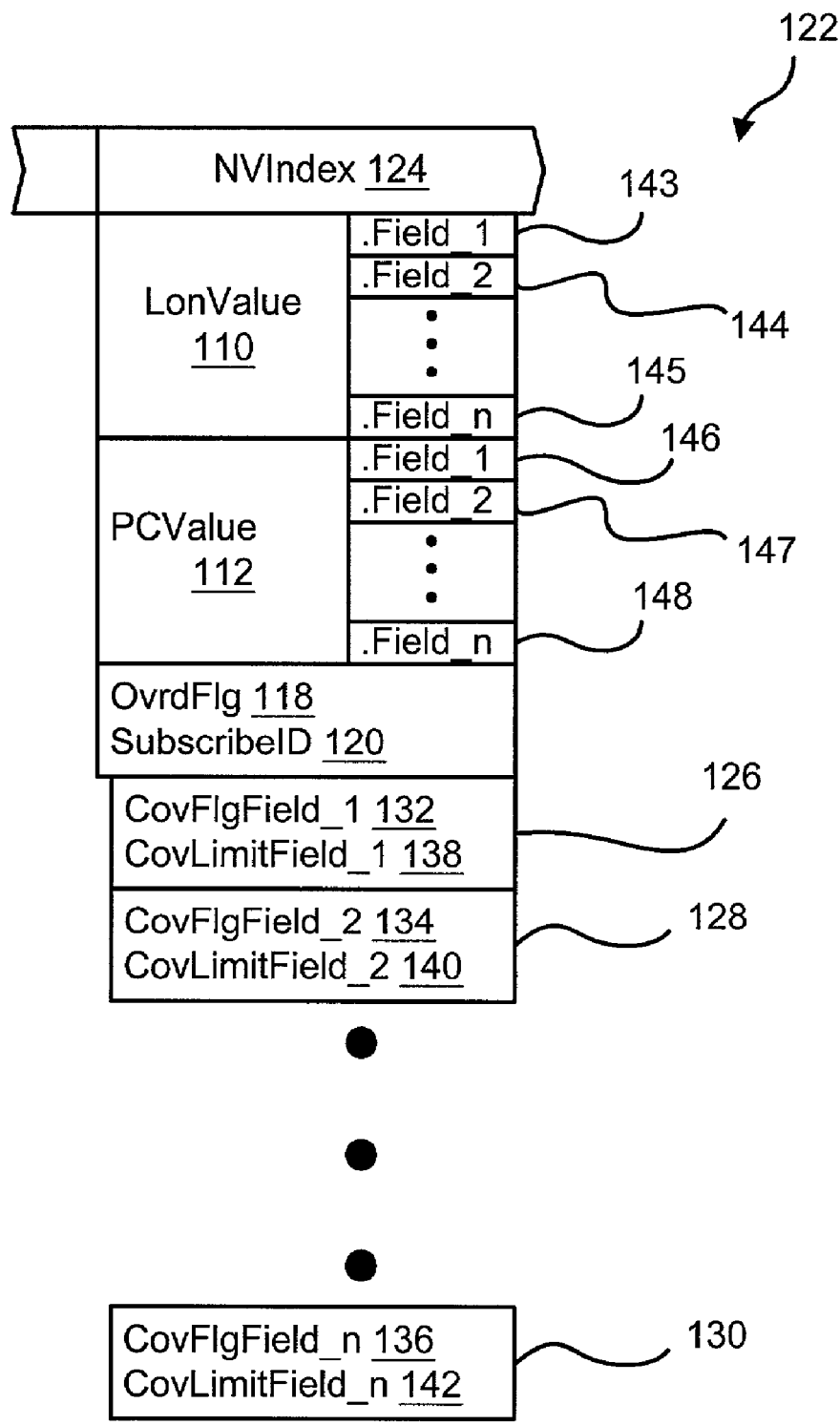
FIG. 5 illustrates a preferred structure of the various components of an NV in an NV Server Application as shown in FIG. 4.

A preferred structure of a Network Variable shown in FIG. 4 is generally indicated at 122 in FIG. 5. There are three fields that indicate general information about the NV as a whole. More specifically, there is a NV Index 124 (e.g., NVIndex) for indicating the identity of the NV, the Override Flag 118 (e.g., OvrdFlg) that indicates whether the NV is in an override state and the Subscribe Identification 120 (e.g., SubscribeID) that indicates whether the NV is in a subscribe state. The override flag 118 is defined by a "1" for indicating a true value and a "0" for indicating a false value, while the subscribed state is enabled with an address defined an a "O" for disabled. As explained, the LonValue 110 indicates the NV value expose on the Lon Network and the PCValue 112 indicates the NV value to and from the control application. As a result of the use of multiple separate values for the NV, the NV server is able to service requests from control applications while overcoming some of the limitations that are inherent to the Lon Network. For example, the NV server component of the PC allows more user defined limits and customization. Furthermore, the NV server allows a means to poll or override the values of the NV without removing or creating a binding to another NV. Thus, the NV server allows more services on the Lon Network, which was greatly limited previously.

In addition, an NV may include multiple fields. The LonValue 110 consists of one or more fields 143, 144, 145 that can range from 1 to n. The PCValue 112 consists of one or more fields 146, 147, 148 that can range from 1 to n. For each field in the NV, there is a corresponding Change of Value Flag: 132, 134, 136 (e.g., CovFlgField). For each field in the NV, there is a corresponding Change of Value Limit 138, 140, 142 (e.g., CovLimitField). The CovFlgField and the CovLimitField indicate when a report should be generated when a change of value occurs for an NV. With the use of these separate values for the fields, more control is created on the Lon Network. Furthermore, more customization is achieved by the present invention, since users can designate a COV limit that is better fitted for their objective for each field.

Figure 6:
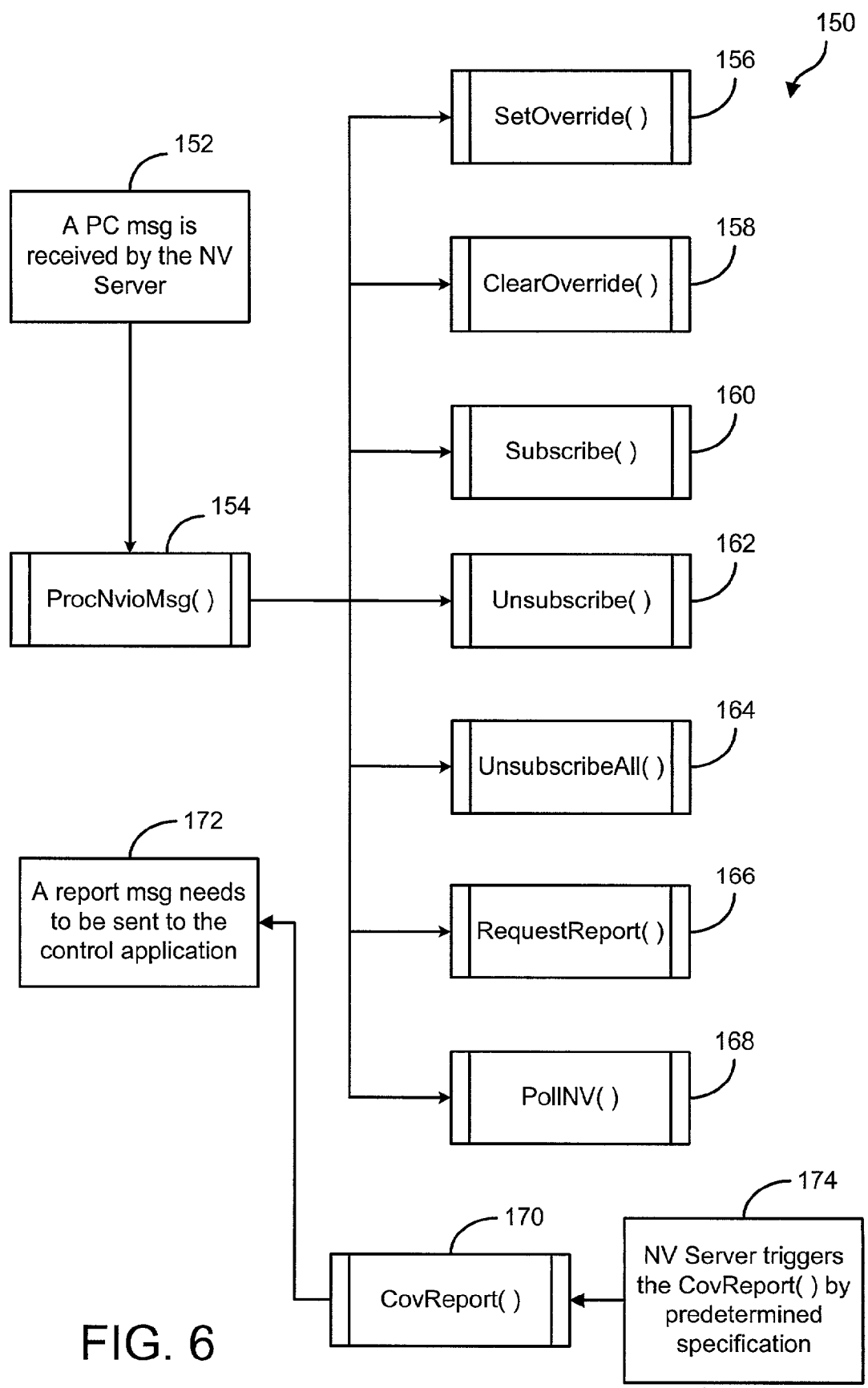
FIG. 6 illustrates an overall flow chart of the executable functions upon a message being received by the NV Server Application.

An overall flow chart of the executable functions upon a message being received by the NV Server application is shown in FIG. 6, and indicated generally at 150. An NV I/O message is received by the NV Server 66 (block 152), which initiates the NV Server to execute a ProcNvioMsg( ) function 154. In turn, the ProcNvioMsg( ) function 154 executes the requested function indicated by the PC message, which can be any one of the following functions: a SetOverride( ) function 156, a ClearOverride( ) function 158, a Subscribe( ) function 160, a Unsubscribe( ) function 162, a UnsubscribeAll( ) function 164, a RequestReport( ) function 166, a PollNV( ) function 168. In addition, a CovReport( ) function 170 is also executed for sending a report to the control application (block 172) when there is a COV of an NV which is triggered by the NV Server (block 174). It should be noted that the functions listed may be altered or changed. For example, some functions can be excluded or other functions not specified can be included. Because there are numerous ways to design the structure of the NV Server, these other variations in the available functions are contemplated and are within the scope of the present invention.

Figure 7:
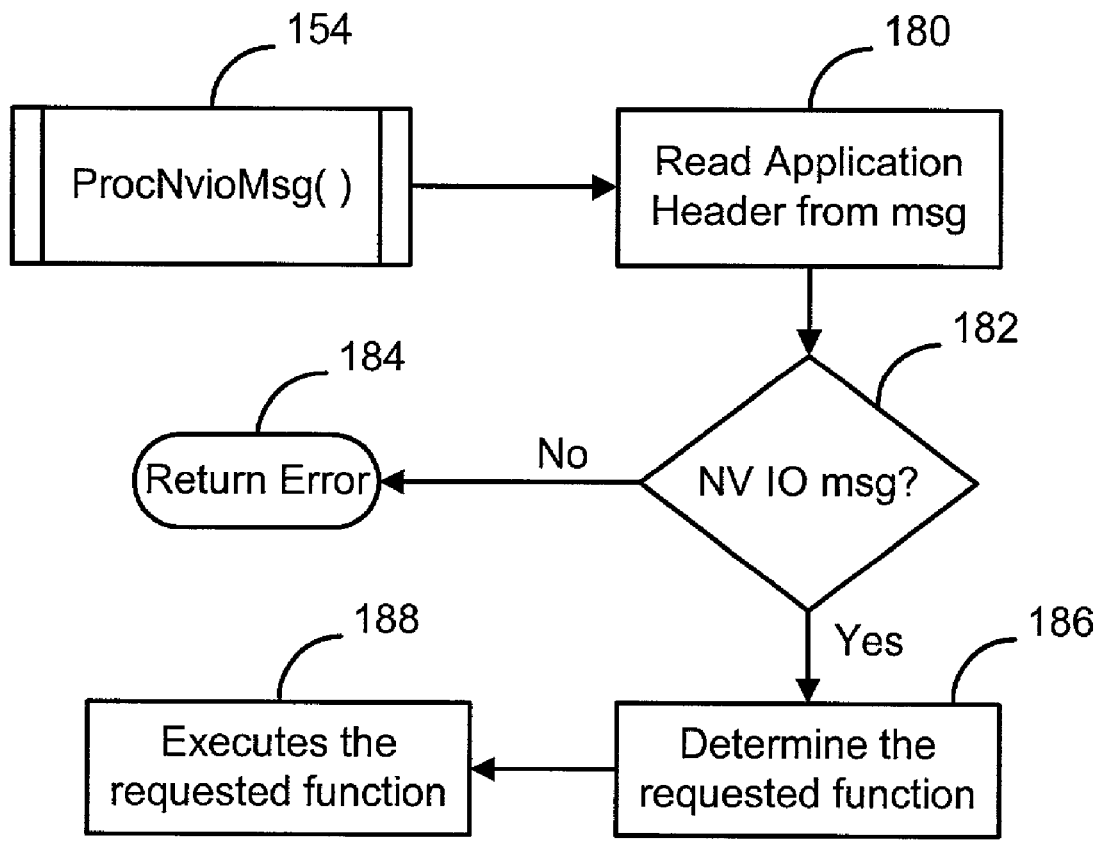
FIG. 7 illustrates a flow chart for the ProcNvioMsg( ) function shown in FIG. 6.

Turning now to FIG. 7, a flow chart for the ProcNvioMsg( ) function 154 shown in FIG. 6 is illustrated. The ProcNvioMsg( ) function is a process for executing the requested function of the NV I/O message. First, the application header is read from the NV I/O message (block 180), and the ProcNvioMsg( ) function further determines whether the message is a valid NV IO message (block 182). If not, an error message is returned (block 184), since the NV Server is configured to process NV IO messages. If, on the other hand, the message is a valid NV IO message, the requested function is determined from the message (block 186). Accordingly, the ProcNvioMsg( ) function executes the requested function (block 188).

Figure 8:
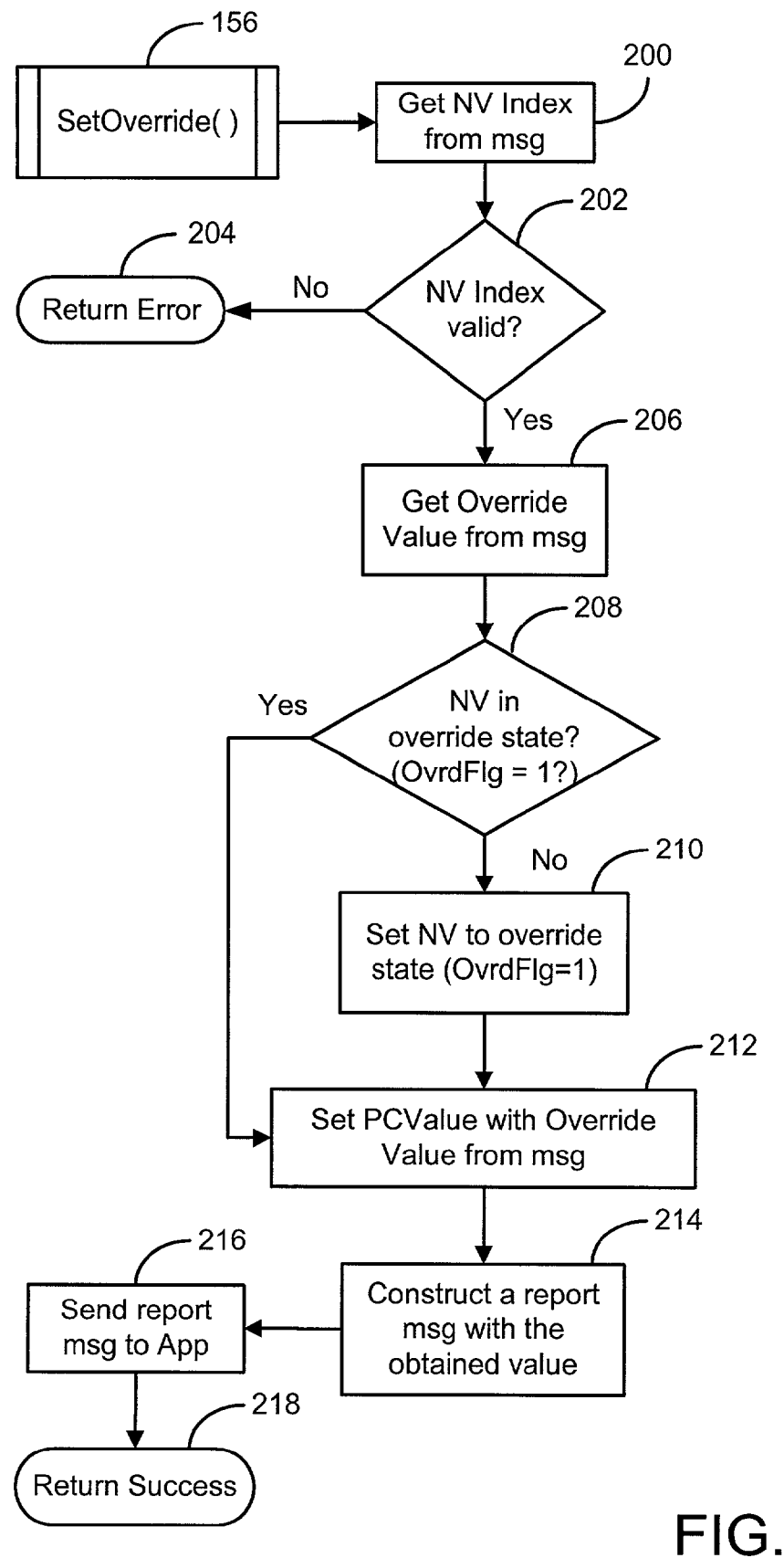
FIG. 8 illustrates a flow chart for the SetOverride( ) function shown in FIG. 6.

A flow chart for the SetOverride( ) function 156 is shown in FIG. 8. The SetOverride( ) function 156 defines a process for setting an NV to the override state with a user defined override value. More specifically, the NV index is first obtained from the message (block 200), and the program determines whether the obtained NV index is valid (block 202). If the NV index is invalid (block 202), an error message is returned (block 204). If, however, the NV index is valid (block 202), an override value of the NV is obtained from the message (block 206). It is then determine whether the NV is in an override state (i.e., OvrdFlg=1) (block 208). If not (block 208), the network variable is set to an override state (i.e., Set OvrdFlg=1) (block 210). Once the NV is in the override state, the PCValue is replaced with the obtained override value from the message (block 212). Then, the NV Server constructs a report message with the obtained override value (block 214), and the update message is sent to the control application (block 216), which is followed by a success message being returned (block 218).

Figure 9:
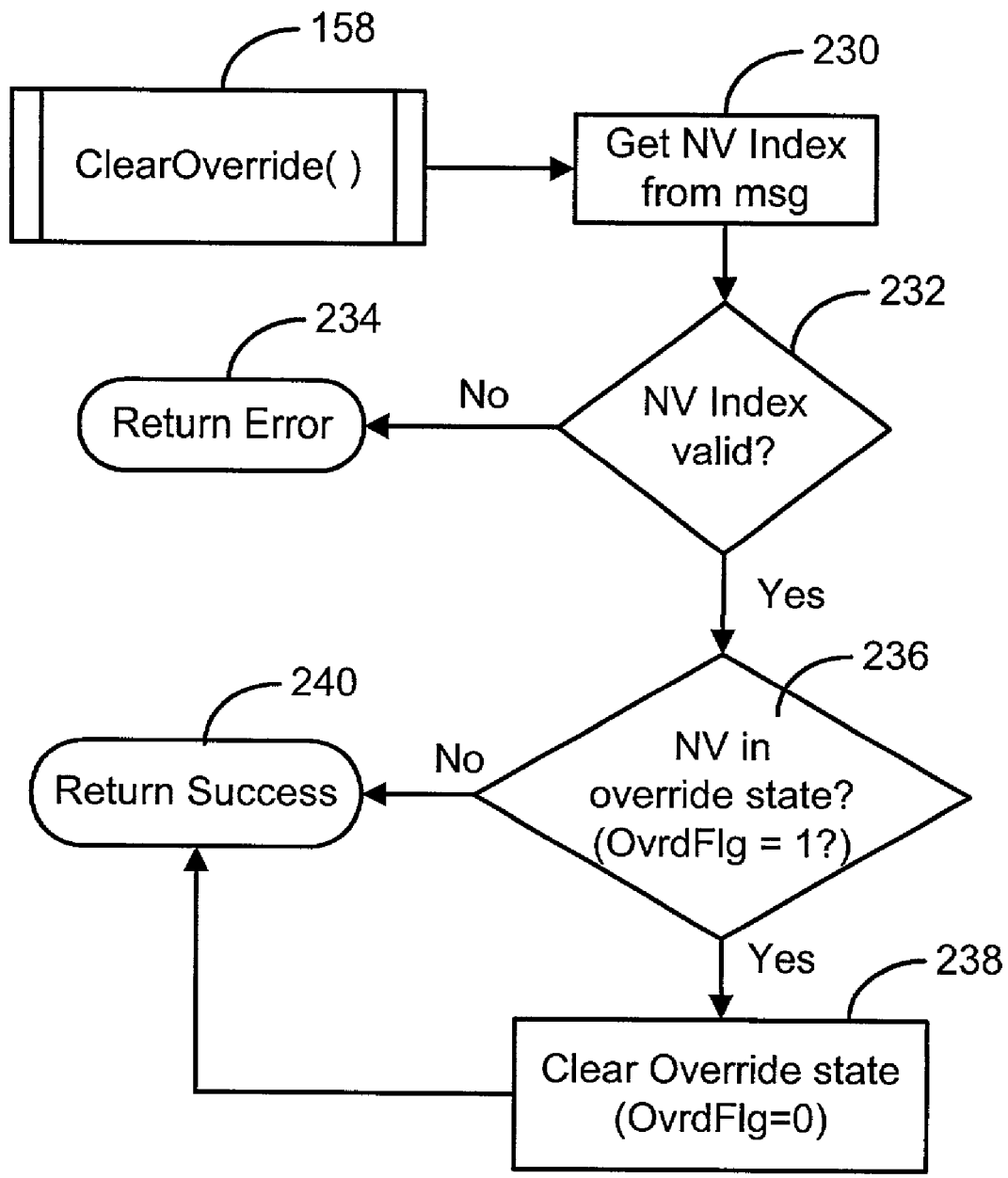
FIG. 9 illustrates a flow chart for the ClearOverride( ) function shown in FIG. 6.

A flow chart for the ClearOverride( ) function 158 is shown in FIG. 9, which provides a process for clearing the override state of a NV. The program obtains the NV Index from the message (block 230), and determines whether the obtained NV Index is valid (block 232). An error message is returned if the NV Index is invalid (block 234). Otherwise, it is next determined whether the NV is in an override state (i.e., OvrdFlg=1) (block 236). If the NV is in the override state (block 236), the override state will be cleared (i.e., Set OvrdFlg=0) (block 238). Once the NV is not in an override state, a success message is returned (block 240).

Figure 10:
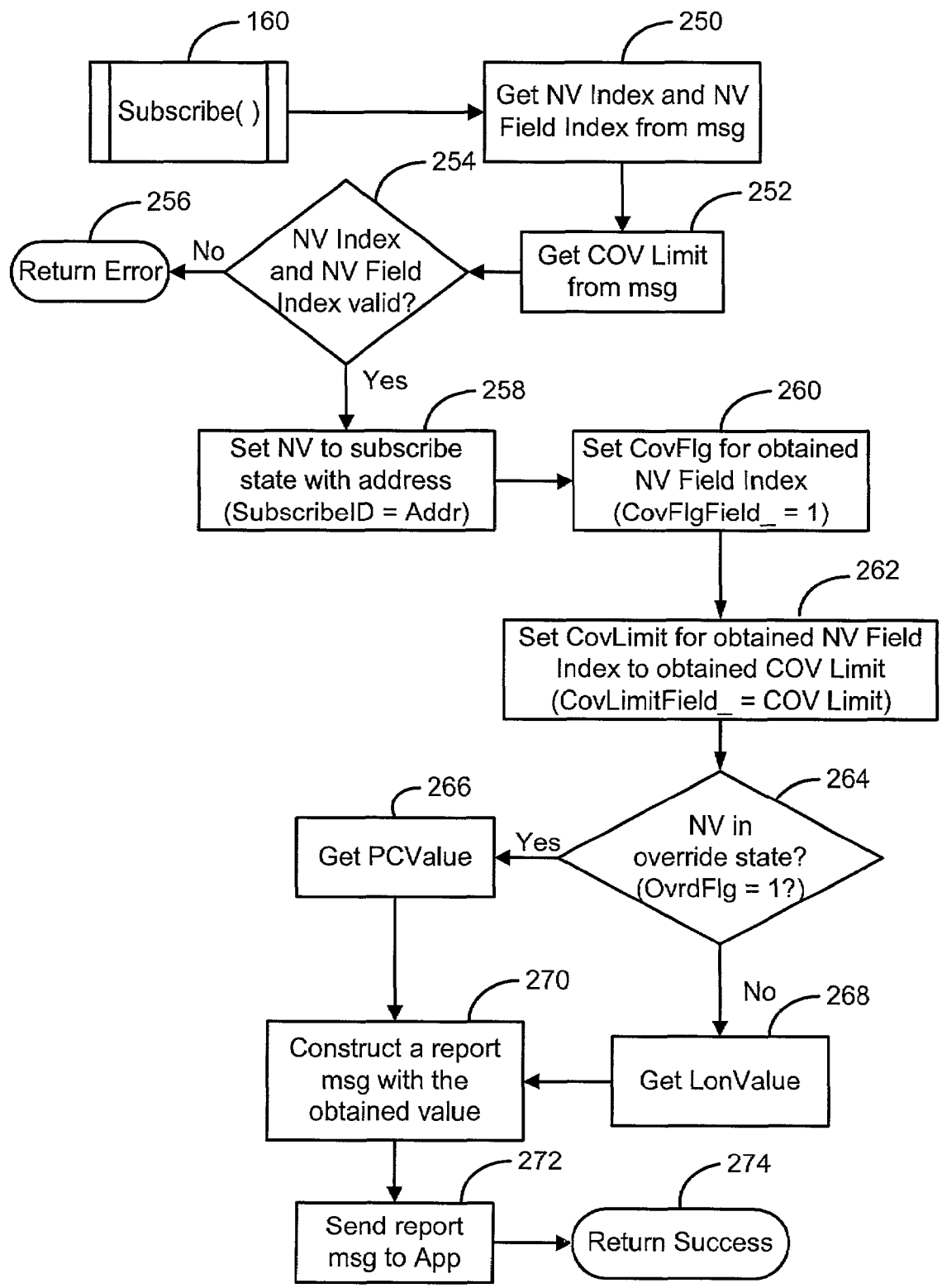
FIG. 10 illustrates a flow chart for the Subscribe( ) function shown in FIG. 6.

A flow chart for the Subscribe( ) function 160 for subscribing to a NV with a specified a COV limit for a specified field of a NV is shown in FIG. 10. The NV index and the NV Field Index are obtained from the message (block 252), which is followed by the COV limit also being obtained from the message (block 252). If the obtained NV Index and NV Field index are deemed invalid (block 254), an error message is returned (block 256). Otherwise, the process continues by setting the NV to a subscribe state for this specified NV with the address in which the report should be sent to (SubscribeID=Addr). After the Subscribe Identification for the NV is set (block 258), the COV flag for the specified field is set (i.e., CovFlgField_=1) (block 260). Next, the COV limit for the specified field is set to the obtained COV limit from the message (CovLimitField_=COV Limit) (block 262). It is next determined whether the NV is in an override state (i.e., OvrdFlg=1) (block 264). If so, the PCValue of this specified NV is obtained (block 266). Otherwise, the LonValue of the specified NV is obtained (block 268). Accordingly, a report message is constructed with the obtained value (block 270), and sent to the address of the control application indicated by the Subscribe Identification (block 272), which is followed by a success message being returned (block 274).

Figure 11:
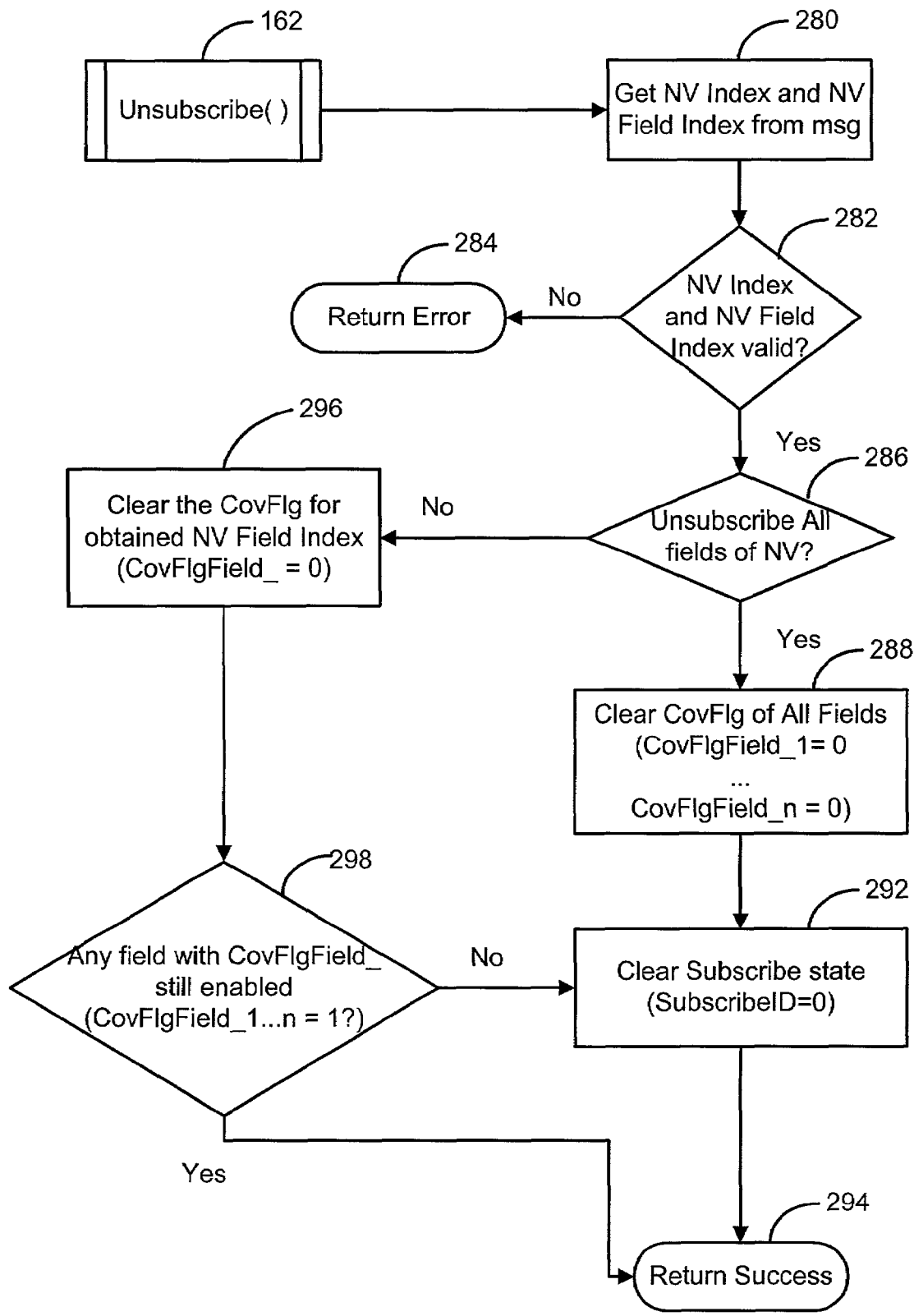
FIG. 11 illustrates a flow chart for the Unsubscribe( ) function shown in FIG. 6.

A flow chart for the Unsubscribe( ) function 162 for clearing a subscribe state for a specified field of a NV is shown in FIG. 11. The NV index and the NV Field Index are obtained from the message (block 280). If the obtained NV index and the NV Field Index are deemed invalid (block 282), an error message is returned (block 284). Otherwise, it is next determined from the message whether all fields of the NV are requested to be unsubscribed (block 286). If all fields have been requested (block 286), the cov flag of all the fields are cleared (e.g., CovFlgField_1=0 . . . CovFlgField_n=0) (block 288). The Subscribe Identification of the specified NV will also be cleared (block 290), and a success message is then returned (block 292).

However, if only a specified field has been requested (block 286), then the cov flag of the specified field is cleared (block 296). It is determined whether any other fields have their cov flag enabled (block 298). If no such enabled cov flag is found (block 298), the Subscribe Identification for the NV will be cleared (i.e., SubscribeID=0) (block 292). Otherwise (block 298), the NV Subscribe Identification will be left alone, and a success message is returned (block 294).

Figure 12:
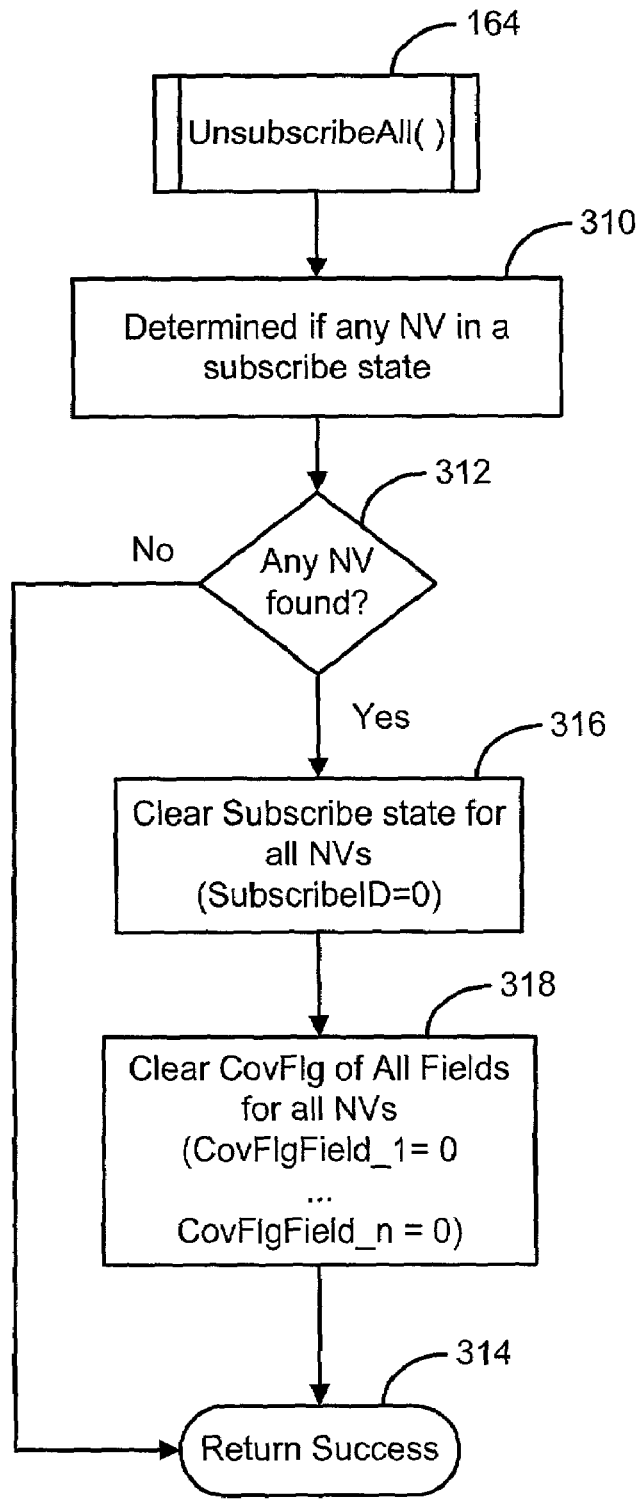
FIG. 12 illustrates a flow chart for the UnsubscribeAll( ) function shown in FIG. 6

A flow chart for the UnsubscribeAll( ) function 164 for clearing the subscribe state of all NVs is shown in FIG. 12. First, the UnsubscribeAll( ) function 164 determines whether there is any NV with the Subscribe with the Subscribe Identification enabled (block 312), then a success message is returned (block 314), because there is nothing to unsubscribe. If, on the other hand, a NV is found with an enabled Subscribe Identification (block 312), all NV Subscribe Identifications will be cleared (i.e., Set SubscribeID=0) (block 316). Once the NVs are cleared (block 316), all the fields of all NVs will also be cleared (e.g., CovFlgField_1=0 . . . CovFlgField_n=0) (block 318), and a success message is then returned (block 314).

Figure 13:
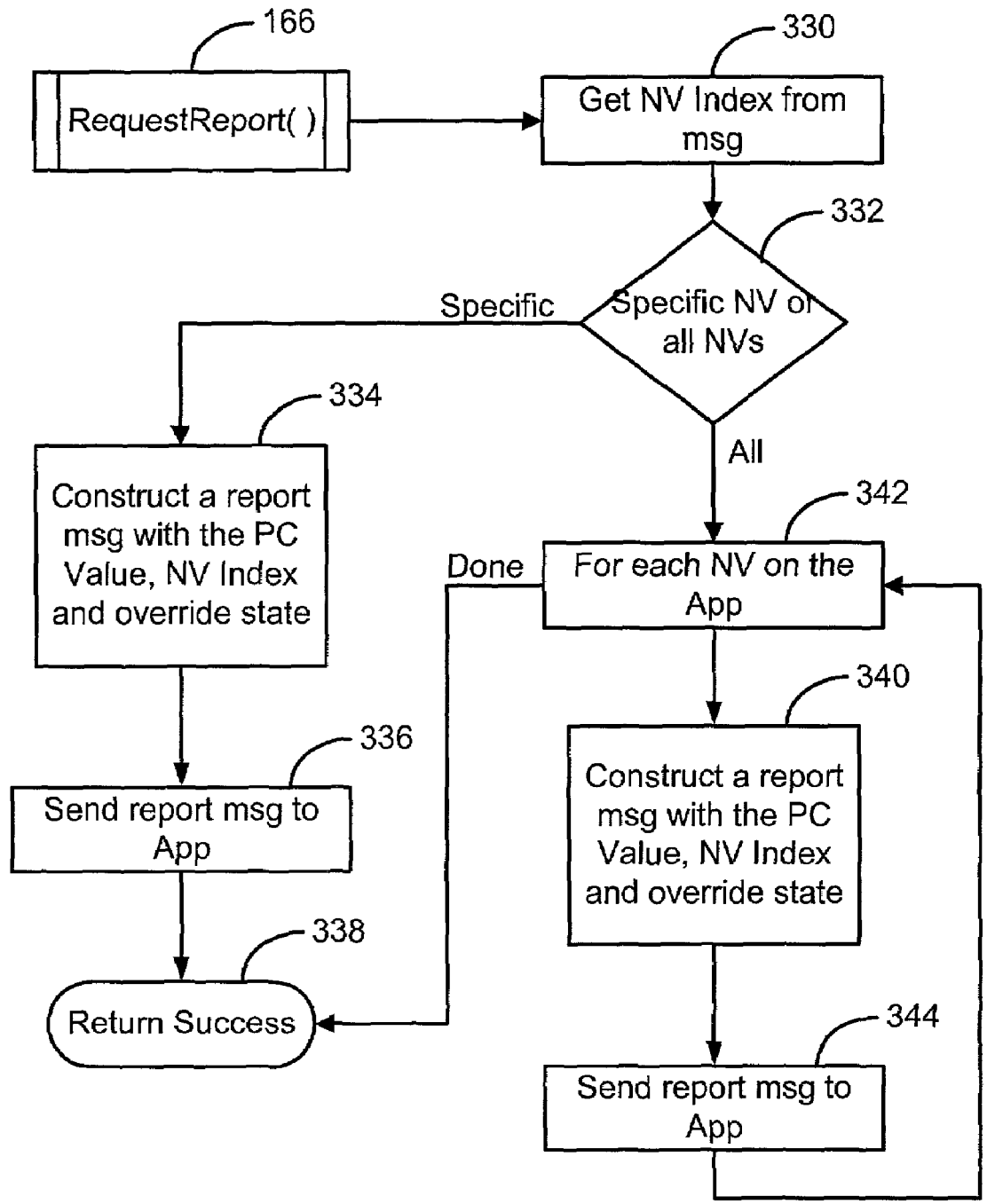
FIG. 13 illustrates a flow chart for the RequestReport( ) function shown in FIG. 6.

A flow chart for the RequestReport( ) function 166 for reporting the override state of a NV is shown in FIG. 13. The NV Index is first obtained from the message (block 330). It is next determined whether the report is requested for a specific NV or for all NVs (block 332). If a report is requested for a specific NV (block 332), a report message with the PC value, NV Index and the override state for the specific NV will be constructed (block 334) and sent to the control application (block 336). The process ends with a success message being returned (block 338).

If, on the other hand, a report is requested for all NVs (block 342), a report message with the PC value, NV Index and the override state will be constructed (block 340) for each NV (block 342), and each report is sent to the control application (block 344). The process continues until a report for all NVs have been constructed and sent. Once this process is complete, a success message will be returned (block 338).

Figure 14:
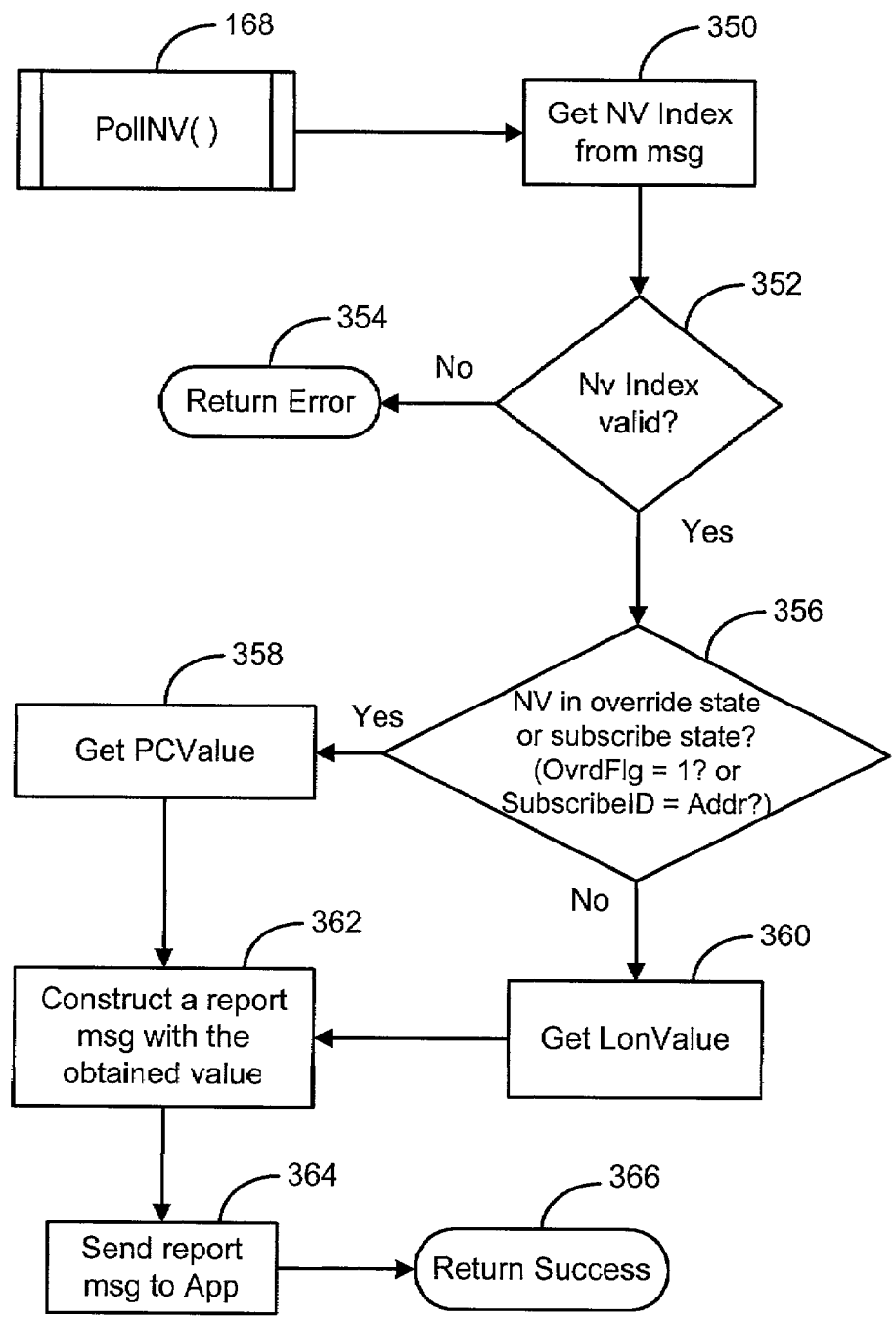
FIG. 14 illustrates a flow chart for the PollNV( ) function shown in FIG. 6; and, FIG. 15 illustrates a flow chart for the CovReport( ) function shown in FIG. 6.

A flow chart for the PollNV( ) function 168 for reporting the value of a specified network variable is shown in FIG. 14. The NV Index is obtained from the message (block 350). If the NV Index is determined invalid (block 352), an error message is returned (block 354). Otherwise (block 352), it is next determined whether the NV is in a subscribe state or an override state (i.e., OvrdFlg=1 or SubscribeID=Addr) (block 356). If the NV is either in a subscribe state or an override state (block 356), the PCValue will be obtained (block 358). However, if the NV is not in the subscribe state or the override state (block 356), the LonValue will be obtained (block 360). The obtained value will then be constructed in a report message (block 362) and sent to the control application (block 364). At this point, the process will end with a success message being returned (block 366).

Figure 15:
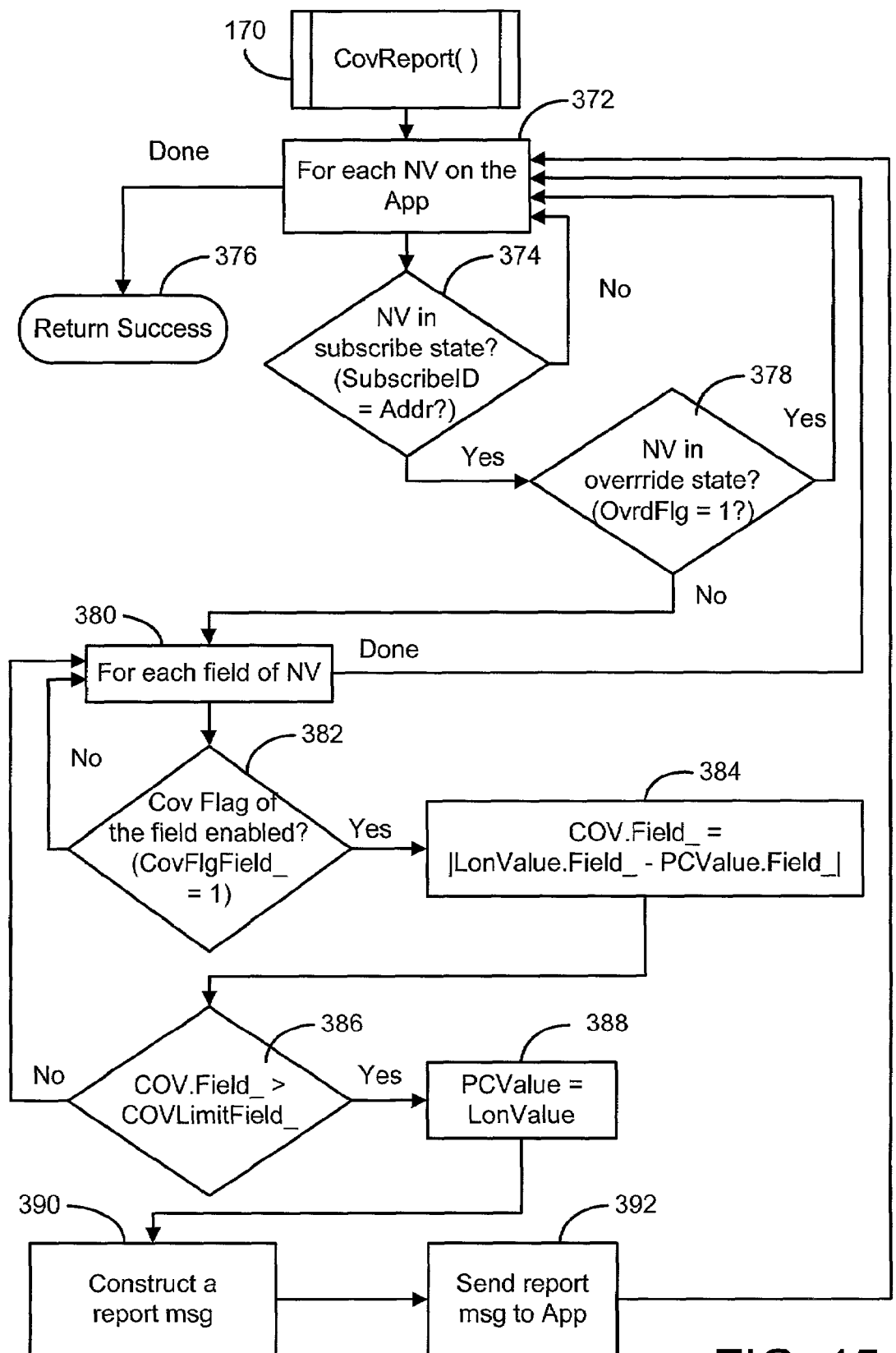

A flow chart for the CovReport( ) function 170 for periodically sending reports in response to a change of value of the network variables is shown in FIG. 15. When the NV Server triggers the CovReport( ) (block 174) (FIG. 6), it is first determined whether an NV (block 372) is in a subscribe state (block 374). If it is determined that no NV is in the subscribe state (block 374), the process ends and a success message is returned (block 376). If, however, a NV is found to be in a subscribe state (block 374), it is next determined whether the NV that is in the subscribe state is also in an override state (block 378). In the case where the NV is in the subscribe state and the override state, the process reloops back for the next NV until all NVs have been processed (block 372).

On the other hand, once it is determined that the NV is in the subscribe state (block 374) and is not in the override state (block 378), the process continues and determines which field or fields (block 380) of the NV has the COV flag enabled (block 382). When a COV flag of a field is enabled (block 382), the COV of the field is set to equal to the absolute difference between the LonValue and the PCValue of the field (i.e., COV.Field_=|LonValue.Field_–PCValue. Field_| (block 384). Then, it is determined whether the COV of the field is greater than the COV Limit designated to the field (i.e., COV.field_>COVLimitField_) (block 386). If not (block 386), the process loops back to check for the next field (block 380). On the other hand, if the COV of the field is, in fact, greater than the COV limit of the field (block 386), the PCValue of the NV is set to be equal to the LonValue of the NV (block 388). At this point, a report message is contructed (block 390) and sent to the control application (block 392). Once this is done, the process loops back for the next NV until all the NVs have been processed (block 372).

From the foregoing description, it should be understood that an improved system and method for servicing messages between controller nodes and control applications via a Lon Network have been described, having many desirable attributes and advantages. In particular, with the use of two different values for the NV, the present invention allows different functions to be configured and executed on the Lon Network. Consequently, more services are offered through the present invention. Furthermore, as a result of the configuration of the present invention, more customizations are allowed. Consequently, a HVAC control system that provides more flexibility and efficiency is created. The present invention makes simplified modifications and updates to the system without unnecessarily interrupting the system.

While various embodiments of the present invention have been shown and described, it should be understood that other modifications, substitutions and alternatives are apparent to one of ordinary skill in the art. For example, as described herein, since various networks are contemplated, there are numerous ways to implement the network topology, depending on needs and the configuration of the network. Furthermore, the functions or services of the present invention can be modified or excluded in addition to adding functions not specified to provide a more customized implementation of the present invention. Such modifications, substitutions and alternatives can be made without departing from the spirit and scope of the invention, which should be determined from the appended claims.

Various features of the invention are set forth in the appended claims.

What is claimed is:

1. A system for servicing messages between device controller nodes and control applications via a Lon Network, wherein the controller nodes includes a plurality of network variables for defining parameters of the Lon Network, comprising:
    a server for servicing said messages from at least one device control application; wherein each network variable on the server comprises:
        a Lon value for indicating a network variable value as exposed on the Lon Network by way of conventional Lon network communication protocols; and
        a proprietary communication value for assigning or overriding a designated network variable value from the control applications without having to unbind the network variable.

2. The system as defined in claim 1 wherein the system is adapted to be interfaced with the Internet.

3. The system as defined in claim 1 wherein said server selectively uses one of said proprietary communication value or said Lon value.

4. The system as defined in claim 1 wherein said server periodically sends subscribed reports in response to a change of value of the network variables.

5. The system as defined in claim 1 wherein said network variables can selectively comprise: an override flag to indicate whether the network variable is in an override state; and, one or more Subscribe Identification fields to indicate whether the network variable is in a subscribe state and the identities of subscribers.

6. The system as defined in claim 1 wherein said network variables can selectively comprise at least one field for defining a designated description of the network variable.

7. The system as defined in claim 6 wherein said at least one field further comprises: an identification for uniquely identifying said at least one field; a Change of Value Flag for indicating whether a report should be sent for said at least one field when there is a change of value; and, a Change of Value Limit for defining a limit for sending a report for said at least one field when there is a change of value.

8. The system as defined in claim 1 wherein the server services the messages with any one or more of the functions from the group consisting of:
- a ProcNvioMsg( ) function for executing a requested service of the message;
- a SetOverride( ) function for setting an override state defined with a user defined override limit of at least one specified field of a network variable;
- a ClearOverride( ) function for clearing the override state of a network variable;
- a Subscribe( ) function for subscribing to a report whenever there is a change of value defined within a user defined limit for a specified field of a network variable;
- a UnSubscribe( ) function for clearing a subscribe state of a specified field of a network variable;
- a UnsubscribeAll( ) function for clearing a subscribe state of all network variables;
- a RequestReport( ) function for reporting the override state of a network variable;
- a PolINV( ) function for reporting the value of a specified network variable; and,
- a CovReport( ) function for periodically sending subscribed reports in response to a change of value of the network variables.

9. A method for servicing messages between device controller nodes and control applications implemented on a Lon Network having each network variable comprised of:
- a Lon value for indicating a network variable value as exposed on the Lon Network by way of conventional Lon network communication protocols; and
- a proprietary communication value for assigning or overriding a designated network variable value from the control applications without having to unbind the network variable, wherein said method comprising the steps of:
  - reading a message from at least one control application;
  - verifying whether the message is valid;
  - determining the requested function for a specified network variable from the message when the message is valid;
  - executing the requested function for the specified network variable; and,
  - sending subscribed reports in response to a change of value of the network variables independently of the foregoing steps.

10. The method according to claim 9 wherein the network is interfaced with the Internet.

11. The method according to claim 9 wherein the step of executing a requested function comprises the steps of:
- obtaining a Network Variable Index and a Network Variable Field Index from the message;
- determining whether the Network Variable Index and a Network Variable Field Index are valid; and,
- returning an error message when the Network Variable Index or the Network Variable Field Index is invalid.

12. The method according to claim 9 wherein the step of executing a requested function comprises the steps of:
- obtaining a Change of Value Limit of a specified network variable from the message;
- selling the specified network variable to a subscribe state;
- recording the identity of the subscriber; and,
- enabling a Change of Value Flag of a specified field of the network variable; and,
- setting the Change of Value Limit of the network variable with the obtained Change of Value Limit from the message.

13. The method according to claim 12 further comprising the steps of:
- determining whether the network variable is in an override state;
- obtaining the proprietary communication value previously sent to a controller node when the network variable is in an override state; and,
- obtaining the Lon value when the network variable is not in an override state.

14. The method according to claim 13 further comprising the steps of:
- constructing a report message with the obtained value;
- sending an update message to the control application; and,
- returning a success message.

15. The method according to claim 9 wherein the step of executing a requested function comprises the steps of:
- determining whether all fields of the network variable should be unsubscribed from the message;
- clearing a Change of Value flag for a specified field when not all fields of the network variable should be unsubscribed; and,
- clearing the Change of Value flag for all fields when all fields of the network variable should be unsubscribed.

16. The method according to claim 15 wherein the step of clearing a Subscribe Identification for a specified field further comprises the steps of:
- determining whether there is any field with the Change of Value flag enabled;
- clearing the subscribe state of the network variable when there is a field in a subscribe state; and,
- returning a success message when there is no field in a subscribe state.

17. The method according to claim 15 wherein the step of clearing a Subscribe Identification for all fields further comprises the steps of:
- clearing the subscribe state of the network variable; and,
- returning a success message.

18. The method according to claim 9 wherein the step of executing a requested function comprises the steps of:
- obtaining a Network Variable Index from the message;
- determining whether the Network Variable Index is valid; and,
- returning an error message when the Network Variable Index is invalid.

19. The method according to claim 9 wherein the step of executing a requested function comprises the steps of:
- obtaining an override value from the message; and,
- setting the proprietary communication value with the obtained override value from the message.

20. The method according to claim 19 wherein the step of executing a requested function comprises the steps of:
- constructing a report message with the obtained value;
- sending an update message to a controller node; and,
- returning a success message.

21. The method according to claim 19 prior to the step of setting the proprietary communication value with the obtained override value further comprising the steps of:
- determining whether the network variable is in an override state; and,
- setting the network variable to the override state when the network variable is not in an override state.

22. The method according to claim 9 wherein the step of executing a requested function comprises the steps of:
  determining whether the network variable is in an override state;
  clearing the override state of the network variable when the network variable is in an override state; and,
  returning a success message when the network variable is in an override state.

23. The method according to claim 22 wherein said step of determining whether the network variable is in an override state further comprises the step of returning a success message when the network variable is not in an override state.

24. The method according to claim 9 wherein the step of executing a requested function comprises the steps of:
  determining whether the network variable is in a subscribe state or an override state;
  obtaining the proprietary communication value previously sent to the a controller node when the network variable is in an override state or in a subscribe state; and,
  obtaining the Lon value when the network variable is not in an override state and a subscribe state.

25. The method according to claim 24 further comprising the steps of:
  constructing a report message with the obtained value, wherein the obtained value is the proprietary communication value when the network variable is in an override state or in a subscribe state, and wherein the obtained value is the Lon value when the network variable is not in an override state and a subscribe state;
  sending a update message to the control application; and,
  returning a success message.

26. The method according to claim 9 wherein the step of executing a requested function comprises the steps of:
  determining whether there is any specified network variable in a subscribe state;
  clearing a subscribed flag for any enabled network variable;
  clearing the Subscribe Identification of all the fields for each enabled network variable; and,
  returning a success message.

27. The method according to claim 26 wherein the step of determining whether there is any specified network variable in a subscribe state further comprises the step of returning a success message when there is no specified network variable in the subscribed state.

28. The method according to claim 9 wherein the step of executing a requested function comprises the steps of:
  obtaining a Network Variable Index from the message;
  determining whether a report is requested for a specified network variable or all network variables;
  constructing a report message with the proprietary communication value, the network variable index and the override state for a specified network variable when a report for a specified network variable is requested; and,
  constructing a report message with the proprietary communication value, the network variable index and the override state for each network variable when a report for all network variables is requested.

29. The method according to claim 28 wherein the step of constructing a report message for a specified network variable further comprises the steps of:
  sending a report message to the controller node; and,
  returning a success message.

30. The method according to claim 28 wherein the step of constructing a report message for each network variable further comprises the steps of:
  sending the report message to a controller node after each report message is constructed; and,
  returning a success message after each report message has been successfully sent.

31. The method according to claim 9 wherein the step of executing a requested function comprises the steps of:
  setting a Change of Value of a field of a network variable to a value that equals to the absolute difference between the Lon Value and the Proprietary Value of the field;
  determining whether the Change of Value is greater than the Change of Value Limit assigned to the field;
  setting a POValue to the LonValue of the network variable; and,
  constructing a report message with the Change of Value of the field.

32. The method according to claim 31 wherein the step of constructing a report message further comprises the step of sending an update message to controller node.

33. The method according to claim 31 prior to the step of setting a Change of Value of a field further comprises the steps of:
  determining whether each network variable on the controller node is in a subscribe state;
  determining whether each network variable in the subscribe state is in an override state; and,
  determining whether each field of a network variable that is in the subscribe state is in a subscribe state when the network variable in the subscribe state is not in an override state.

34. The method according to claim 33 further comprising a step of returning a success message once all the network variables have been processed.

35. A computer program product comprising a computer readable code stored on a computer readable medium that, when executed, causes a computer to:
  read a message from at least one control application;
  verify whether the message is valid;
  determine the requested function for a specified network variable from the message when the message is valid;
  execute the requested function for the specified network variable; and,
  send subscribed reports in response to a change of value of the network variables independently of the foregoing steps,
  wherein said network variable comprises a Lon value for indicating a network variable value as exposed on the Lon Network by way of conventional Lon network communication protocols; and a proprietary communication value for assigning or overriding a designated network variable value from the control applications without having to unbind the network variable.

* * * * *